Jan. 31, 1961
W. R. PARKHURST
2,969,857
AUTOMOBILE-TRAILER COUPLING HAVING
AUTOMATIC TRAILER-BRAKE
OPERATING MEANS
Filed June 24, 1957
2 Sheets-Sheet 1
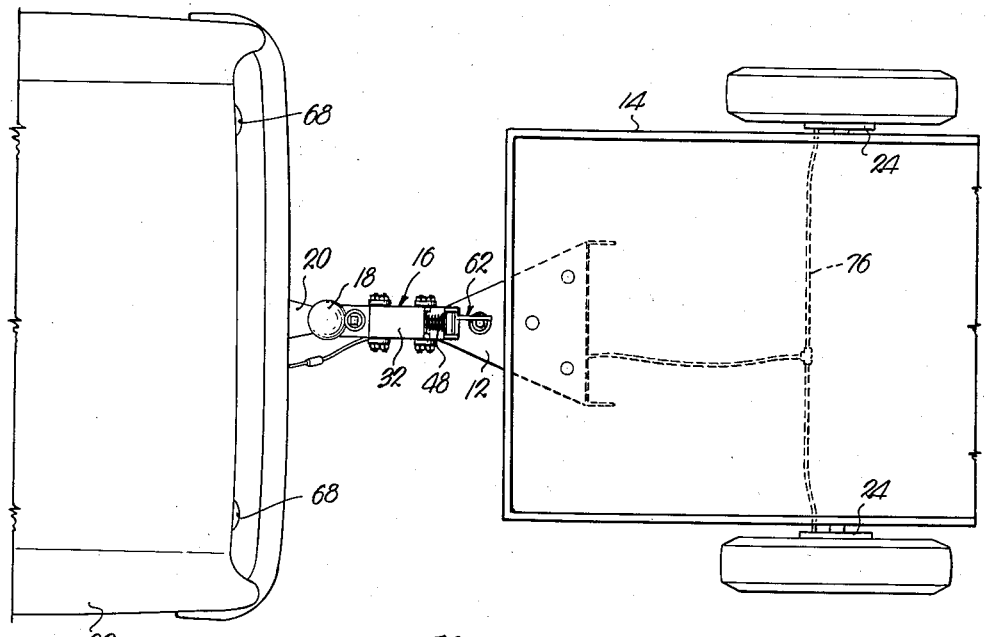
Fig. 1.
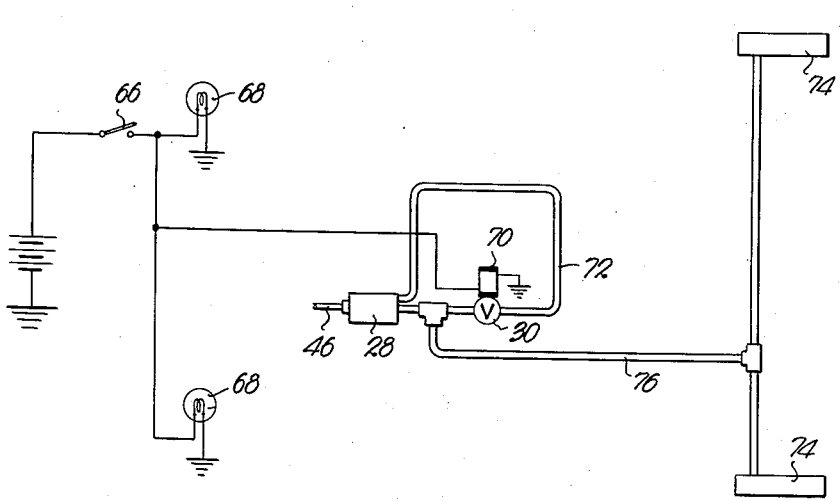
Fig. 6.
INVENTOR.
William R. Parkhurst
BY
ATTORNEY.

Jan. 31, 1961

W. R. PARKHURST 2,969,857

AUTOMOBILE-TRAILER COUPLING HAVING
AUTOMATIC TRAILER-BRAKE
OPERATING MEANS

Filed June 24, 1957

INVENTOR.
William R. Parkhurst
BY
INVENTOR.

United States Patent Office 2,969,857
Patented Jan. 31, 1961

2,969,857
AUTOMOBILE-TRAILER COUPLING HAVING AUTOMATIC TRAILER-BRAKE OPERATING MEANS

William R. Parkhurst, R.R. 3, Sedalia, Mo.

Filed June 24, 1957, Ser. No. 667,383

1 Claim. (Cl. 188—112)

This invention relates to improvements in mechanism for coupling trailers to towing vehicles and including as a component thereof, means for automatically applying hydraulic brakes of a trailer in response to the tendency of such trailer to move toward the towing vehicle as the speed of the latter is reduced or stopped.

It is the most important object of the present invention to provide hydraulic brake actuating mechanism for trailers that includes parallel linkage interconnecting a support and a bracket mounted on the trailer and attached to the towing vehicle respectively, rendering the mechanism highly sensitive to speed changes and, therefore, operable to brake the trailer before the latter tends to impart forward thrust to the vehicle pulling the same and which, by its sensitivity, is also operable to release the trailer brakes forthwith upon resumption or increase of speed.

A further object of the present invention is to provide mechanism of the aforementioned character that is simple and inexpensive to manufacture yet durable, easily maintained, long-lasting, not easily damaged, and quickly adapted for mounting on the tongue of virtually any type of trailer.

In the drawings:

Fig. 1 is a plan view showing a trailer and a towing vehicle fragmentarily and including an automobile-trailer coupling having automatic trailer-brake operating means made pursuant to the present invention.

Fig. 6 is a schematic diagrammatical view illustrating the electrical and hydraulic components of the mechanism.

Figure 4:
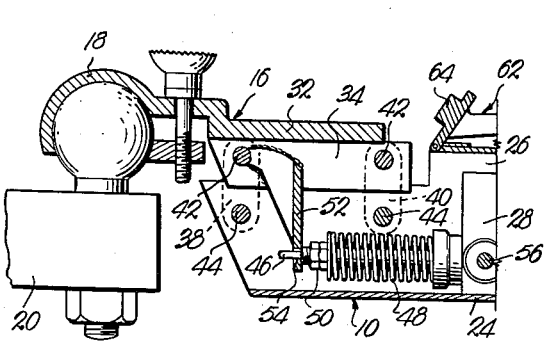
Fig. 4 is a fragmentary, sectional view similar to Fig. 3 but illustrating the parts in the brake applying position.

The component parts of the hydraulic trailer-brake actuating mechanism illustrated in the drawings include a support broadly designated by the numeral 10 rigidly mounted to tongue 12 of trailer 14, a bracket 16 overlying the support 10 at the forwardmost end of the latter and having a forwardly extending coupling member 18 of conventional character connected to tow bar 20 of towing vehicle 22 as shown in Figs. 1 and 4.

The support 10 is U-shaped presenting a horizontal bight 24 and a pair of upstanding legs 26. Support 10 at least partially underlies the tongue 12 and is attached thereto in any suitable manner presenting therefore, a housing for a master hydraulic brake cylinder unit 28 and a solenoid valve 30.

The bracket 16 is likewise U-shaped presenting a horizontal bight 32 and a pair of spaced, elongated bars 34 depending from the bight 32.

Figure 2:
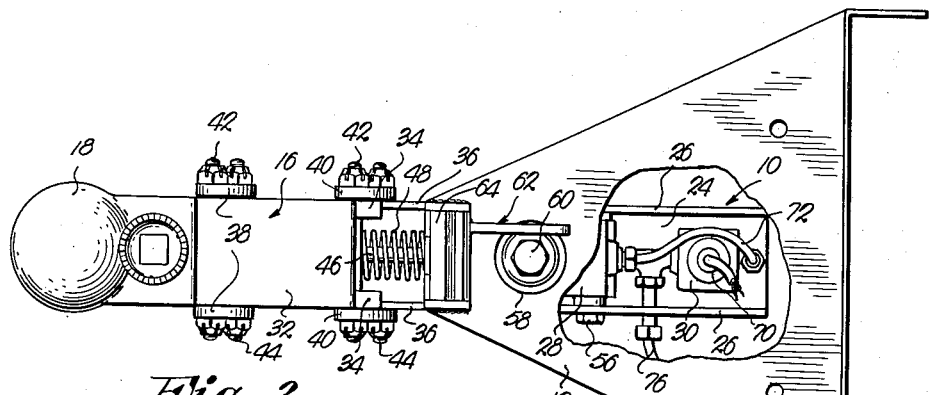
Fig. 2 is an enlarged plan view of the hydraulic trailer-brake actuating mechanism per se.
Figure 3:
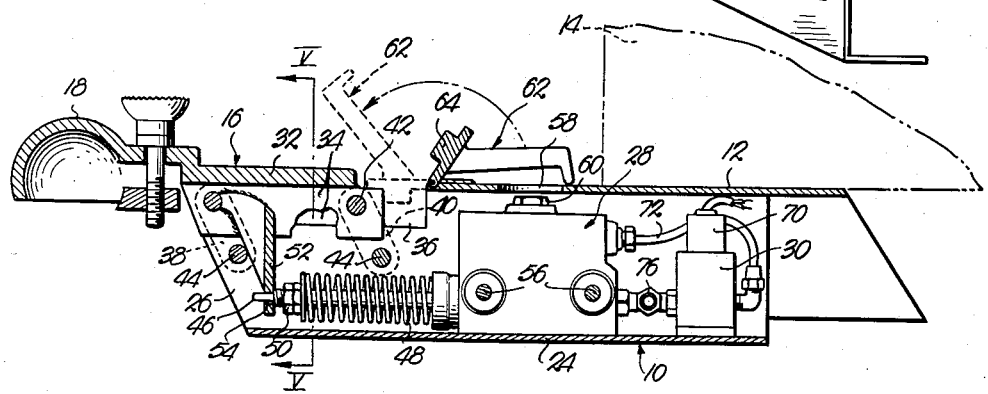
Fig. 3 is a central, longitudinal cross-sectional view through such mechanism.
Figure 5:
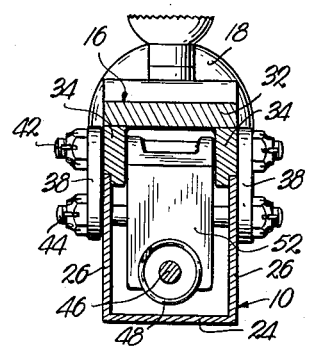
Fig. 5 is a transverse, cross-sectional view taken on line V—V of Fig. 3.

The legs 26 are notched at the forwardmost ends thereof as seen in Figs. 3 and 4, presenting uppermost edges 36 normally engaged by the bars 34 as seen in Figs. 3 and 5. To this end the lowermost edges of the bars 34 are rabbeted as seen in Fig. 5 to receive the edges 36 and to overlap the legs 26 therewithin when the bracket 16 and the support 10 are disposed relatively in the normal pulling operation of trailer 14.

Bracket 16 and support 10 are interconnected by parallel linkage which includes a pair of forward links 38 and a pair of rear links 40, all embracing the legs 26 and the bars 34. Uppermost pins 42 swingably connect the four links to the bars 34 and lowermost pins 44 swingably attach the links to the legs 26.

The reciprocable piston (not shown) of the master unit 28 has a forwardly extending rod or stem 46 around which is coiled a spring 48 whose tension may be adjusted by manipulation of stop nuts 50 adjacent the outer end of the rod 46. An abutment plate 52 rigid to the bracket 16 and depending therefrom between the bars 34 and between the forward links 38 and the rear links 40, loosely receives the outermost reduced end of the rod 46 through the medium of a relatively large opening 54 in the plate 52.

The master unit 28 is secured to the support 10 by fasteners 56 extending through the legs 26, and an opening 58 is provided in tongue 12 rendering plug 60 accessible for replenishing the supply of hydraulic fluid to the reservoir of the master unit 28.

A lock 62 is provided to prevent relative movement between the support 10 and the bracket 16. It is hingedly mounted to the tongue 12 and/or the legs 26 adjacent the notches which present the edges 36. As is clear in Fig. 3 of the drawings, lock 62 is swingable to and from a position where lug 64 thereof is interposed between the rearmost edges of bars 34 and the forwardmost end of tongue 12.

The solenoid valve 30 is operably coupled with the back-up circuit of the towing vehicle 22 in the manner shown by Fig. 6. To this end it is seen that upon closing of switch 66 to energize back-up lights 68, solenoid 70 is energized to open the normally closed valve 30 permitting fluid to circulate freely through by-pass 72 coupled with the master cylinder unit 28. Normally however, when solenoid 70 is de-energized, fluid flows to brake cylinders 74 from the master cylinder 28 when the latter is placed in operation by way of line 76 since the closed valve 30 prevents fluid flow through the by-pass 72.

In operation, when the trailer 14 is placed in tow, and during forward movement of the vehicle 22, the pulling force that is imparted to the trailer 14 from the tow bar 20, extends the bracket 16 and the support 10 in the manner shown in Fig. 3. Consequently, the support 10 is swung upwardly and rearwardly to a position where the edges 36 of the legs 26 thereof engage the lowermost rabbeted edges of bars 34.

If, at any time during the towing operation, the speed of the vehicle 22 is decreased and the trailer 14 tends to move forwardly toward the vehicle 22 and with respect to the latter, tongue 12 and therefore, support 10 swing downwardly and forwardly relative to the bracket 16 by virtue of the action of the links 38 and 40. Manifestly, the edges 36 move away from the bars 34 and the master unit 28 moves toward the abutment plate 52. Rod 46 slides freely relative to the plate 52 within the opening 54 against the action of spring 48, thereby actuating the piston within the cylinder unit 28 and applying the brakes of the trailer 14.

Spring 48 therefore, serves as a bumper and its tension is the determining factor with respect to the tendency of trailer 14 to surge forwardly toward the towing vehicle 22. When the support 10 has moved to the position shown in Fig. 4 relative to bracket 16, the brakes of the trailer 14 are fully applied and since the opening 54 in plate 52 is relatively large, plate 52 is permitted to move from the position shown in Fig. 3 to the position illustrated by Fig. 4 while the rod 46 remains horizontal and substantially parallel to the upper face of bight 24.

As above made clear, swinging of the lock 62 to the dotted line position shown in Fig. 3 renders the brake system of the trailer 14 inoperable and permits backing of the trailer 14 by the vehicle 22 or otherwise, without operating the trailer-brake actuating mechanism. By the same token, when the vehicle 22 is placed in reverse to close switch 66, the brake-actuating mechanism is rendered inoperable because of the energization of solenoid 70 and, therefore, opening of the valve 30 in the manner above described.

Having thus described the invention what is claimed as new and desired to be secured by Letters Patent is:

Hydraulic trailer-brake actuating mechanism comprising a U-shaped support adapted for rigid mounting on the tongue of a trailer, said support having a horizontal bight and a pair of spaced, upstanding legs; a U-shaped bracket overlying the support at the forwardmost end of the latter and provided with a forwardly extending coupling member for connecting the bracket to a towing vehicle, said bracket having a horizontal bight and a pair of bars depending from the bight, said bars being in substantially the same vertical plane as the upstanding legs and adapted to engage and overlap said legs; a front and a rear pair of pivoted parallel links swingably interconnecting the bracket and the support, said links being positioned to hold said bars and said legs out of engagement in a vertical position and permitting said bars and said legs to engage when said links are inclined whereby towing and braking force of the vehicle is transferable to said trailer through said support and bracket; a hydraulic cylinder housed by the support and the tongue, said cylinder being secured to the support and having a horizontal, spring loaded piston rod extending forwardly therefrom between said legs; an abutment between the front and rear links depending from the bracket between the bars and between the legs and engaging said rod for actuating the latter as the support swings forwardly relative to the bracket and downwardly away therefrom; and locking means carried by the tongue and engageable with said bars whereby the relative swinging movement of said support and said bracket may be prevented.

References Cited in the file of this patent

UNITED STATES PATENTS

| | | |
|---|---|---|
| 1,824,845 | Stout | Sept. 29, 1931 |
| 2,114,279 | Claus | Apr. 19, 1938 |
| 2,662,616 | De Lateur | Dec. 15, 1953 |
| 2,779,443 | Tucker | Jan. 29, 1957 |
| 2,800,204 | Wall | July 23, 1957 |

FOREIGN PATENTS

| | | |
|---|---|---|
| 1,115,222 | France | Apr. 20, 1956 |